Patented July 13, 1937

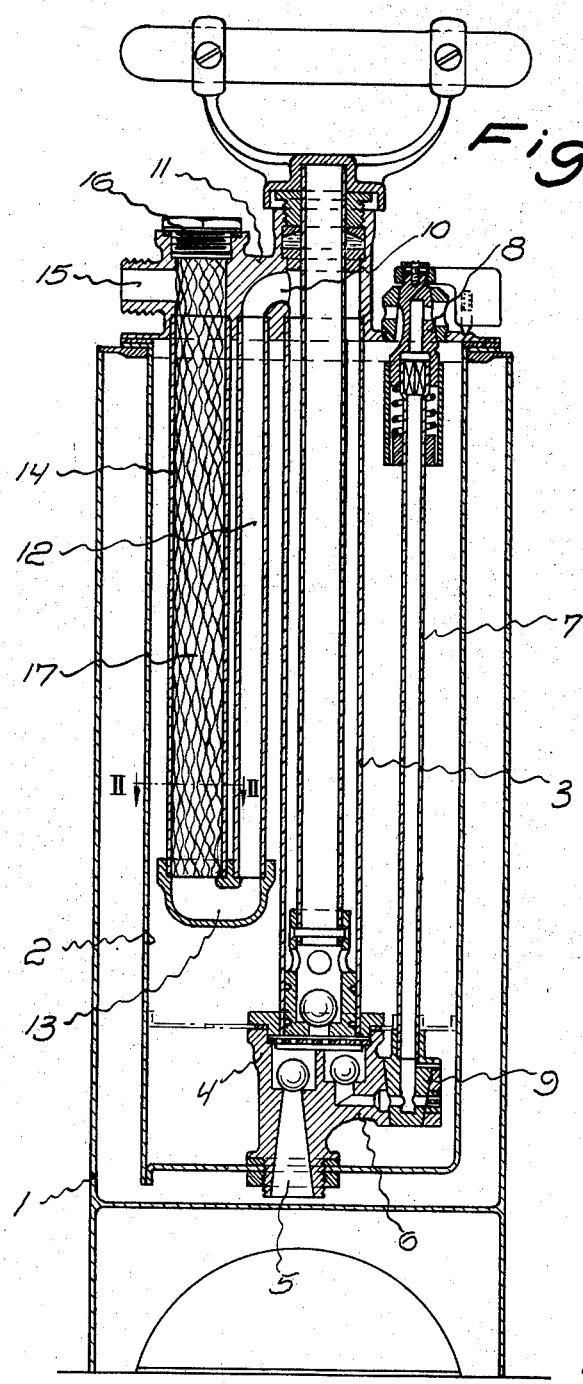

2,086,944

UNITED STATES PATENT OFFICE 2,086,944

APPARATUS FOR PRODUCING FOAM

Bror Pålsson, Malmo, Sweden

Original application August 15, 1934, Serial No. 740,010. Divided and this application March 14, 1935, Serial No. 11,149. In Denmark November 29, 1933

2 Claims. (Cl. 261—123)

My present invention is divided out of my patent application Ser. No. 740,010 filed Aug. 15, 1934, U. S. Patent No. 2,029,336, dated February 4th, 1936, and relates to apparatus for producing, or improving the quality of, foam, especially such foam as is used for fire extinguishing purposes and is produced mechanically by forcing a mixture of air or other gaseous medium and a foaming liquid through a foam producer or improver for producing a fine foam of the said mixture, or for improving the quality of, i. e. giving increased fineness to, the coarse foam that the said mixture might form before it is forced through the said foam producer or improver.

The foam producer or improver according to my invention consists of a tubular chamber the interior of which is subdivided in a large number of longitudinally extending narrow channels by means of transversely spaced, longitudinally extending division walls or members extending substantially in the direction of flow through the chamber. This construction has been found to offer but a relatively low resistance to the flow of the mixture of the air or other gaseous medium and the foaming liquid, or the foam produced thereby, but nevertheless to give a good result with regard to the quality of the foam. Due to the reduction of the resistance to the flow, the power consumption required for the production of the high quality foam is lessened, and this is of an essential importance especially when the intention is to provide a foam fire extinguisher which is adapted to be manually operated while still being of sufficient capacity for being actually useful.

The liquid of the coarse foam or mixture of liquid and air or other gaseous medium that enters the longitudinally extending narrow channels or passages into which the tubular chamber is subdivided has a tendency to seek the walls or boundary surfaces of these channels or passages and to adhere to these walls or surfaces that extend in the direction of flow through the chamber, while the air or other gaseous medium has a tendency to seek the central portions of the passages and to flow at a greater speed than the liquid. This results in that the flowing air or other gaseous medium catches, so to say, the liquid adhering to the walls or boundary surfaces of the narrow passages and tends to take it along, thereby exerting a pull on the liquid. This pull on the liquid is opposed by the adhession of the liquid to the walls or boundary surfaces of the passages and therefore results in the liquid being drawn out into films against its surface tension and air inclosed in such films to form foam bubbles. The foam bubbles thus formed are rolled or forced forwards along the channels or passages and will adhere to any further liquid on the walls or boundary surfaces of the passages and draw it out into films enclosing free air between the foam bubbles already formed to form further foam bubbles and to join or work together all the foam bubbles, until a continuous or coherent foam mass of a fine cellular structure is obtained.

In accordance with the principles of this method of producing or improving the foam it is essential that the longitudinally extending channels or passages into which the tubular chamber is subdivided, though relatively narrow, should be sufficiently wide to allow for both the liquid and the air or other gaseous medium to enter and pass through the same simultaneously with each other at any section of the individual passages and should not be so fine as to be comparable with the pores of porous bodies, the pores of which cannot at the same section contain both air and liquid but will contain the air and the liquid at alternating portions of their lengths. If the longitudinal channels or passages are made relatively wide, the necessary length of the tubular chamber, which is subdivided into these channels or passages will have to be given a greater length in order to convert the coarse foam or mixture of the air and the foaming liquid into a foam mass of the desired fineness, and too great a length of the subdivided tubular chamber which may be in the form of a portion of a conveying conduit for the foam, may be found impractical.

The invention is illustrated somewhat diagrammatically by way of examples on the accompanying drawing in which:

Fig. 1 is a view in vertical section showing a fire-extinguishing apparatus for projecting foam, which is provided with a form of the foam producer or improver according to my invention.

Fig. 2 is a cross section of the foam producer or improver on line II—II in Fig. 1.

Figs. 3 to 5 inclusive are similar cross sections showing modifications.

The fire-extinguishing apparatus shown in Fig. 1 for illustration purposes comprises outer and inner receptacles 1 and 2 respectively, the outer receptacle for carrying water and the inner receptacle for carrying a charge of liquid foaming agent such as a relatively concentrated solution of saponin in water. A hand operable piston pump 3 is vertically arranged in the inner receptacle 2, and a suction valve structure 4 is connected to the pump at the lower end thereof and has an inlet 5 for water from the outer receptacle 1 and an inlet 6 for liquid foaming agent from the inner receptacle 2. An air intake pipe 7 extends into the inner receptacle 2 and is connected to the suction valve structure. The intakes for air and foaming agent to the pump can be shut off or controlled at will by suitable means such as cock valves 8 or 9 or the like. The pump has a pressure outlet 10 provided in a cover head 11 on the inner receptacle 2, and from this outlet 10 a pipe 12 extends downwardly to an elbow 13, from which a tubular housing of pipe 14 extends upwardly to an outlet opening or stud 15 formed in the head 11, to which a hose or the like (not shown in the drawing) can be connected. In the head 11 there is also provided an opening aligned with the pipe 14 and closed with a screw plug 16.

In the tubular housing or pipe 14 there is inserted (through the opening normally closed with the screw plug 16) a collection of substantially parallel metal rods or wires 17 (compare also Fig. 2) extending longitudinally of the pipe 14, i. e. in the direction of flow through said pipe. These metal rods or wires are spaced transversely so as to leave between themselves a large number of relatively narrow channels or passages extending substantially in the direction of flow through the pipe 14, that is longitudinally thereof. Preferably the transverse spacing of the wires 17 is obtained and maintained by having the said wires corrugated as is indicated more or less diagrammatically in Fig. 1.

When pumping water, liquid foaming agent and air are drawn in by the pump in commixing relation to each other and the mixture or the coarse foam that this mixture might form is forced under pressure through the outlet 10, pipe 12, elbow 13 and pipe 14 to the outlet 15 and further through the hose to be connected thereto and which may have a suitable nozzle at its free end.

By means of the longitudinally disposed corrugated wires 17 by which the interior of the pipe 14 is subdivided in relatively narrow channels or passages extending longitudinally of the said pipe and having their walls or boundary surfaces extending in the same direction, the mixture of air, water and foaming agent is converted into a foam of high quality with a minimum of work; that is to say, this device for producing or promoting the formation of the foam offers but a relatively low resistance to the flow of the air and foaming liquid and the foam produced thereby. As already has been remarked the channels or passages should not be so narrow as to be comparable with the pores of porous or spongy bodies which heretofore have been proposed and which offer a very high resistance making a correspondingly high pressure necessary for forcing the mixture of air and foaming liquid therethrough. In fact, the channels or passages should not be narrower than that the liquid can spread in thin layers on the walls or boundary surfaces of the channels or passages, which surfaces are substantially continuous in the direction of flow, and still leave room for the air to sweep the thin layers of liquid on the said walls or surfaces. When this is the case the flowing air catches or seizes the liquid adhering to the said walls or surfaces and pulls it into thin films against the surface tension of the liquid, which films inclose the air, thus forming interwoven or intimately adjoined small foam bubbles as has already been declared. It is to be noted that the total cross sectional area of the said relatively narrow channels or passages into which the pipe 14, which forms part of the delivery conduit from the pressure source (the pump), is subdivided longitudinally, may be as great as, or nearly as great as, or even greater than the normal cross area of said conduit (the hose) through which the foam produced is forced out to be projected on the point of use. The low resistance against the pumping thus obtained is important for the production of a hand operated apparatus of relatively great capacity, which at the same time is capable of producing foam of a high quality for fire extinguishing purposes; but obviously a foam producing or improving device of the same general character can also be used with larger foam fire-extinguishing engines.

The means for subdividing the foam conduit at a suitable portion of the length thereof in relatively narrow channels or passages extending longitudinally of said portion can be arranged at any suitable place in the said conduit and can also be constructed in different ways. For instance, said means may comprise an insertion or collection of tubes 18 of small diameter as indicated in Fig. 3, or of spaced plates 19 as shown in Fig. 4, which further may be corrugated, as indicated in Fig. 5, and held in interspaced relation through their corrugations. Of course all these different subdividing members extend longitudinally of the tubular chamber or portion of the conduit in which they are disposed.

What I claim is:

1. Apparatus for the continuous production of fire-extinguishing foam, comprising a casing having a passage therethrough, a pump connected with said passage and having an inlet for a mixture of air, and a foam-forming liquid of water mixed with saponine, which pump advances the gas and the foam-forming fluid together through the conduit, an insert in said passage formed of a bundle of thin elements, extending in the direction of flow of the gas and foam-forming fluid, and formed of non-absorbent material, and being spaced apart from each other by projections thereon, the said elements forming elongated contact surfaces extending in the direction of flow, intermediate complete passages being formed between the elements, extending in the direction of flow, for the passage of the mixture of gas fluid, the combined cross-section of which plurality of intermediate passages being about equal to, or only slightly varying from the normal cross-section of the conduit, whereby the said passages are, on the one hand, sufficiently wide to permit spreading out of the fluid entering the passages on the contact surfaces extending in the direction of flow while leaving an intermediate space between them for the gas flowing through, and on the other hand are sufficiently narrow in order, practically, to force all the gas to flow therethrough directly adjacent the surfaces defining the passages.

2. Apparatus for the continuous production of fire-extinguishing foam, comprising a conduit, means for forming a stratified mixture of a gas and a foam forming liquid comprising water containing saponine, means for forcing said mixture through said conduit, a plurality of elongated contact surfaces disposed within a portion of said conduit and extending in the direction of flow, whereby many minute passages are formed in said conduit, the combined cross-sectional area of said passage being approximately equal to or only slightly varying from the normal cross section of the conduit; and the individual passages being of sufficient width to permit the entering fluid to spread out on the contact surfaces thereof extending in the direction of flow, and to permit the penetration of the gas or gas mixture between the fluid strata which have spread out on said surfaces; said passages also being narrow enough to force all of said gas to flow close to the fluid strata, whereby all of the gas takes an active part in forcing the fluid along the contact surfaces in the direction of flow and in extracting the fluid in films to form foam by working the fluid up to proper consistency.

BROR PALSSON.